(12) United States Patent
Patureaux et al.

(10) Patent No.: US 7,828,023 B2
(45) Date of Patent: Nov. 9, 2010

(54) DEVICE FOR LOADING A VESSEL WITH SOLID PARTICLES AND METHOD USING SAID DEVICE

(75) Inventors: Thierry Patureaux, Fontaine la Mallet (FR); Nicolas Dromard, Le Havre (FR); Bernard Cottard, Saint Romain de Colbosc (FR)

(73) Assignee: Total Raffinage Marketing, Puteaux (FR)

( * ) Notice: Subject to any disclaimer, the term of this patent is extended or adjusted under 35 U.S.C. 154(b) by 735 days.

(21) Appl. No.: 11/660,141

(22) PCT Filed: Aug. 5, 2005

(86) PCT No.: PCT/FR2005/002035
§ 371 (c)(1),
(2), (4) Date: Feb. 13, 2007

(87) PCT Pub. No.: WO2006/021662
PCT Pub. Date: Mar. 2, 2006

(65) Prior Publication Data
US 2008/0149215 A1    Jun. 26, 2008

(30) Foreign Application Priority Data
Aug. 13, 2004    (FR) .................................. 04 08875

(51) Int. Cl.
*B67C 3/26*    (2006.01)
(52) U.S. Cl. .................. 141/251; 141/180; 414/199
(58) Field of Classification Search ................. 141/267, 141/256, 12, 251, 258, 260, 286, 71, 73, 141/80, 129, 163; 414/299–301, 160, 180, 414/199; 422/269
See application file for complete search history.

(56) References Cited

U.S. PATENT DOCUMENTS

| 96,455 | A | * | 11/1869 | Mattison | 141/73 |
| 4,307,054 | A | * | 12/1981 | Chion et al. | 264/172.11 |
| 5,247,970 | A | * | 9/1993 | Ryntveit et al. | 141/1 |
| 6,467,513 | B1 | * | 10/2002 | Yanaru et al. | 141/12 |
| 2006/0213575 | A1 | * | 9/2006 | McNaughton | 141/286 |
| 2007/0084519 | A1 | * | 4/2007 | Brennom | 141/2 |
| 2007/0137146 | A1 | * | 6/2007 | Dessen | 53/473 |

FOREIGN PATENT DOCUMENTS

| DE | 40 01 121 A1 | 7/1991 |
| EP | 0 548 999 A | 6/1993 |
| EP | 0 644 137 A | 3/1995 |
| EP | 1 283 070 A | 2/2003 |
| FR | 2 686 964 A | 8/1993 |
| GB | 1 393 179 A | 5/1975 |
| WO | WO 2004/028679 A | 4/2004 |

* cited by examiner

*Primary Examiner*—Gregory L Huson
*Assistant Examiner*—Jason K Niesz
(74) *Attorney, Agent, or Firm*—Sughrue Mion, PLLC

(57) ABSTRACT

The invention relates to a device for introducing solid particles into a vessel, in particular into a chemical reactor which comprises a pipe, preferably flexible and cylindrical, through which said particles flow from the top downward and is characterised in that it also comprises at least one helicoidal ramp (2) which is placed inside the pipe, wound around a central axis (2) and whose width is such that a distance between the external edge (4) of the ramp (2) and the pipe (1) is less than the size of introducible solid particles. A method using the inventive device is also disclosed.

22 Claims, 4 Drawing Sheets

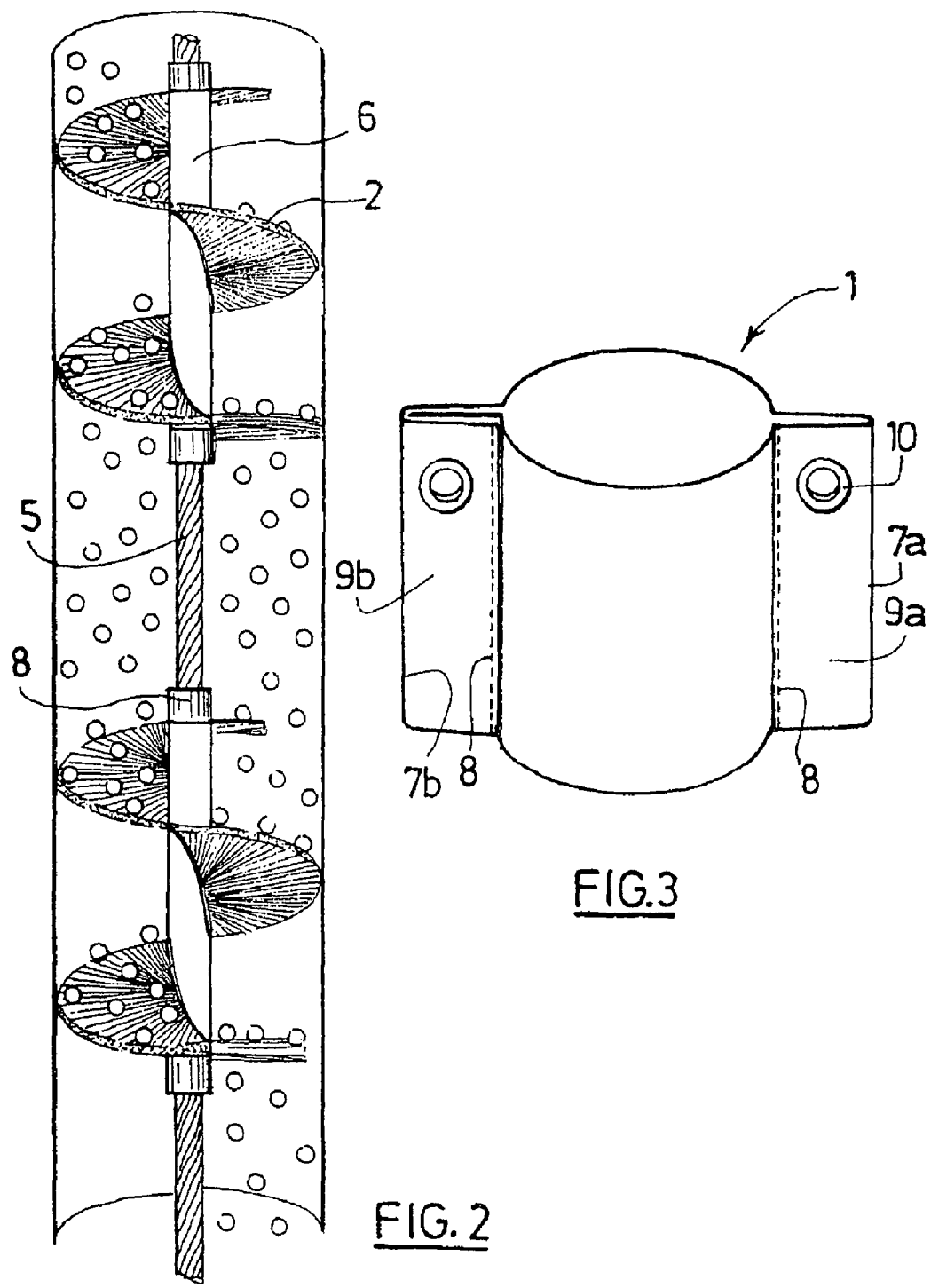

DEVICE FOR LOADING A VESSEL WITH SOLID PARTICLES AND METHOD USING SAID DEVICE

The present invention relates to a device and a method for loading a vessel, especially a large vessel, the height of which may be up to several tens of meters, with solid particles whose physical integrity must be maintained.

The device and the method according to the invention apply more particularly to the loading of fixed-bed reactors, of the chemical, electrochemical, petroleum or petrochemical type, with solid particles that may be in the form of beads, grains, cylinders, disks or rods, or in any other form, provided that they are of relatively small dimensions. The solid particles are in particular relatively fragile solid particles that do not well withstand a free fall from a height of several meters.

The invention will be described below in the case of inert beads, generally made of a ceramic, which are loaded into fixed catalyst bed chemical reactors. However, the Applicant does not mean to be limited to this particular application since the device and the method according to the invention may be used for introducing any other type of particulate material into a vessel.

It is known that many large chemical reactors, for example from 5 to 30 meters in height and about 3 to 6 meters in diameter, contain, at the bottom of the vessel, beneath the catalyst bed, a layer of inert beads, for example having a high alumina concentration, which are larger in size than the catalyst particles, so as to prevent the latter from being accidentally discharged via the bottom collector of the reactor.

These beads generally have a diameter of less than 5 cm and they form, on the base of the reactor—or at any other point therein, for example on the bed support tray in the case of a dual catalyst bed reactor—a bed with a thickness possibly exceeding two meters.

When loading these beads, it is essential for them to be deposited intact on the bottom of the reactor or on the bed support tray, as if they break into small fragments they run the risk of obstructing the outlet collector of the reactor or the support tray, thus resulting in a pressure difference between the inlet and the outlet of the reactor, which is extremely prejudicial to the efficiency of the reactor and therefore in fine to the operator.

Several methods of loading reactors with such relatively fragile beads are known.

Loading, by individually introducing bags or buckets filled with beads into the reactor, which are then emptied by an operator on the bottom of the reactor, constitutes a technique that is very reliable but too slow to be normally exploitable.

Another technique consists in loading the beads using a flexible duct, with a diameter from 10 to 20 cm, operating fully laden, that is to say filled with beads from one end to the other. The operator distributes the beads over the bottom of the reactor, by manually adjusting the diameter of the opening at the lower end of the duct while moving the latter within the reactor. This method, which does not guarantee almost 100% success in loading intact balls, also runs the risk of a major accident happening to the operator. This is because, should the opening system be improperly handled or should the flexible duct supporting a substantial load be torn or disconnected, it may drop or empty, completely and suddenly. This not only results in the beads breaking but poses a considerable safety risk for the operator.

The Applicant has recently proposed, in its patent application FR 2 829 107, a sinuous or helical semirigid duct in which the beads descend by rolling along the internal face of the duct, it being possible to regulate the speed of descent and therefore the kinetic energy at the end of travel via the gradient of the slope. The device described in that application is completely satisfactory both from the standpoint of the rate of loading and the filling quality, but it has the drawback of several size-related problems. Specifically, the sinuous or helical shape of the device and the relative rigidity of the material of the duct make it difficult to transport the device and to install and disconnect it through the manhole of the reactor.

The Applicant was set the objective of providing a device for loading a reactor with solid particles that has the advantages, but not the drawbacks, of the device described in FR 2 829 107; in other words, a device for introducing, onto the bottom of a vessel, at a high rate, relatively fragile particles without breaking them, said device taking up a small amount of space, equivalent to that of a straight duct as described above.

Consequently, one subject of the present invention is a device for introducing solid particles into a vessel, especially into a chemical reactor, comprising a duct, which is preferably flexible and cylindrical, the particles flowing through said duct from the top down, characterized in that it further includes, inside the duct, at least one helical ramp fastened to and wound around a central shaft, said ramp having a width such that the distance between its outer edge and the flexible duct is smaller than the size of the solid particles to be introduced.

Another subject of the invention is a method of loading a vessel, especially a large reactor, with solid particles using such an introduction device.

Each of the helical ramps of the device of the invention receives the solid particles introduced via the upper end of the duct, stopping or preventing said particles from falling freely in the duct by making them slide or roll, under the effect of gravity, at a speed that essentially depends on the slope of said ramp. This device thus makes it possible for the kinetic energy imparted to the particles during their descent in the duct to be limited in a controlled manner, by modifying several of the parameters of said duct, such as the slope of the helical ramp(s) and/or the number, length and/or spacing of the zones of the duct containing such a helical ramp, or else the pitch of the helical ramp(s), it being possible for these parameters to be modified separately or in combination.

The space requirement of the device according to the invention is determined by the external dimensions of the flexible duct surrounding the helical ramp, and is consequently identical to that of a conventional flexible duct and smaller than that of a sinuous or helical duct as described in FR 2 829 107.

The operational safety of a device according to the invention is considerably higher compared with that of a conventional flexible duct as it does not generally operate fully laden, thereby considerably reducing the weight of beads or particles present in the duct at any one time. Moreover, the weight of the beads or particles to be loaded is not, as is the case with a conventional straight flexible duct, supported only by the flexible duct but mainly by the helical ramp that is fastened to the upper part of the reactor by a suspension mechanism independent of that of the duct. The risk of the flexible duct tearing or becoming disconnected is thus considerably reduced.

The central shaft bearing the helical ramp may be made of a rigid material, for example of a metallic material or a thermoplastic or thermosetting resin, or made of a relatively flexible material, for example a plasticized resin or an elastomer, or else a composite material, such as a fiber-reinforced or textile-reinforced rubber or resin. This central shaft may for example take the form of a tube or solid rod.

The ends of the central shaft, or at least those of a shaft element supporting the helical ramp, may also be mounted on pivots so as to allow said shafts to rotate freely under the weight of the beads while they are being loaded, thus making it possible to speed up said loading. Automating the rotation using a motor, for example a pneumatic motor, may also be envisaged.

In a preferred embodiment of the device of the invention, the central shaft is formed by a plurality of shaft elements, which are flexible or rigid, these being articulated one with respect to another. This articulation is particularly beneficial when the central shaft is a relatively rigid tube or rod, as it then advantageously increases the overall flexibility of the device and makes it easier to handle. The design of a central shaft made up of several elements articulated one with respect to another also allows the length of the device to be adjusted according to the height of the reactor, or allows the device to be progressively shortened as said reactor fills up with particles.

The length of each of the articulated elements is preferably between 5 centimeters and 5 meters, depending on the type of reactor to be loaded.

In a preferred embodiment of the invention, the articulation of these elements bearing the helical ramp is preferably accomplished by intermediate elements, or articulation elements. These intermediate elements are preferably flexible elements which do not form an obstacle to the free fall of the solid particles, inside the flexible duct, between two helical ramps. The beads or particles to be loaded thus pass, in succession and alternately, through zones in which they slide or roll along a helical ramp and in zones in which they are in free fall.

The length of the free-fall zones has an influence on the filling rate. The higher the proportion and the greater the length of the free-fall zones, the higher the filling rate. The length of the free-fall zones must however not exceed an upper limit value, above which there is a risk of the beads or particles breaking or becoming damaged. This maximum length of the intermediate elements depends, of course, on the fragility of the objects to be loaded. The Applicant has found that intermediate elements with a length between 5 centimeters and 5 meters, preferably between 0.5 and 3 meters, generally allow rapid filling with a very low bead breakage rate.

The overall proportion of all the free-fall zones relative to the total length of the device according to the invention is preferably between 20 and 80%, in particular between 40 and 70%.

Examples of intermediate elements that may be mentioned include slings, ropes, cables, chains or flexible tubes, bearing, at each of their ends, suitable means for fastening them to the shaft elements bearing a helical ramp.

The helical ramp may be made of any material of sufficient rigidity for supporting the weight of the beads or particles. This may be a sheet of metal, plastic or rubber, or else a brush-type system.

In a preferred embodiment, the helical ramp has a brush-like structure, the number and the rigidity of the bristles that form the brush being sufficient to support the weight of the particles to be introduced when the loading rate is at maximum. The bristles may be inserted into a suitable element, which can be bonded, welded or fastened in another way to the central shaft.

In one particularly preferred embodiment, the helical ramp is a brush formed by crimping resin bristles into a U-shaped section, said section then being welded to a central metal shaft, preferably a metal tube.

A brush-type helical ramp may also be envisaged in which the bristles are held between two rods wound one with respect to the other, the helix formed by the two wound rods constituting the central shaft of a bottle brush-type structure.

The helical ramp of the device according to the present invention is preferably a single helix, but it is also possible to envisage double or multiple helixes. The screw pitch, which determines the slope of the ramp, and consequently the speed at which the particles roll or slide, is preferably between 5 and 100 cm, preferably between 15 and 80 cm.

In order for the ramp to be able to reduce the fall of the particles and effectively slow down their descent in the duct, it is essential for the particles not to be able to drop via the top of the outer edge of the helical ramp. To do this, the outer edge of the latter is preferably in contact with the flexible duct. When the particles have a relatively large size, for example about a few centimeters, a certain gap may be tolerated between the outer edge and the duct, but, as already indicated, this distance must be significantly smaller than the mean dimension of the particles so as to prevent them from falling via the edge of the ramp.

The flexible duct may be made of any material having sufficient mechanical strength to withstand being torn during the loading process. For example, it may be a textile material, preferably knitted or woven, or else a sheet of plastic, optionally reinforced by fibers or by a textile material. The term "flexible duct" is understood in the present invention to mean not only a duct capable of being completely flattened when it is empty, but also a semirigid duct reinforced by rigid annular elements placed at regular intervals, which elements allow the duct to adopt a curvature but prevent it from being flattened.

The inside diameter of the flexible duct surrounding the helical ramps and the intermediate elements preferably does not exceed a few tens of centimeters and is in particular between 50 and 400 mm, preferably between 100 and 200 mm.

According to one preferred embodiment of the invention, the loading device is made up of a number of modules, each module comprising (i) a flexible duct segment and (ii) a segment incorporating a central shaft bearing a helical ramp and, optionally, (iii) an intermediate element, as described above. In such a module, the length of a flexible duct segment (i) is preferably substantially identical to the length of the segment (ii) containing a central shaft or to the overall length of the segment (ii) containing a central shaft and of the intermediate element (iii).

The various modules are fastened together both by concatenation of the internal elements (central shaft with helical ramp and intermediate element) and by joining the ends of the flexible duct segments. Suitable fastening and joining means are known in the art, and a person skilled in the art will have no trouble in choosing those that are suitable. For example, the internal elements may be connected together by appropriate attachment systems and the flexible duct segments may for example be connected by collars joining together flanges provided at the ends of each of the flexible duct segments.

In a preferred embodiment of the device of the present invention, the flexible duct (or a flexible duct segment) includes, over part or all of its length, two straight folds which are diametrically opposed to one another and closed at their base by a line of stitches each fold defining a band extending radially to the outside of the duct. The lateral bands thus created on each side of the duct make it easier to grip the duct and also serve for inserting additional fastening means, such as eyelets. Such additional fastening means must not in fact be located in the flexible duct itself, as this would increase the risk of it tearing.

The loading device according to the present invention is used in a method for loading solid particles into large vessels.

This method comprises:
(a) the fastening of said device via its upper end at an opening (manhole) in the upper part of the vessel; and
(b) the introduction of the solid particles via the upper end of said device.

The vessel is preferably a reactor, generally a cylindrical reactor with a height between 15 and 30 meters and a diameter between 3 and 4 meters. To load such a reactor, it is necessary for an operator to be on the bottom of the reactor at the lower end of the loading device, so as to distribute the particles exiting via the lower end of said device over the entire surface of the bottom of the vessel or of the loading front.

However, the reactor may also be a multitube reactor consisting of a plurality of vertical tubes, each having a similar diameter. In a preferred implementation of the method for loading such a reactor, the filling device is used without the flexible duct surrounding the internal elements (central shaft with helical ramp and intermediate element). In other words, the helical ramps fastened to and wound around a central shaft, and also the intermediate elements, are introduced directly into the tubes of the reactor, the walls of which therefore fulfill the function of the flexible duct, which is absent in this embodiment, consisting in preventing the beads or particles from dropping via the outer edge of the helical ramp. The width of the helical ramp will preferably be chosen so that the distance between the outer edge of the ramp and the wall of the reactor is smaller than the size of the solid particles to be introduced.

The invention will now be described with reference to the appended non limiting drawings in which:

FIG. 2 is a schematic view of a preferred embodiment of the device according to the invention, with two helical ramps;

FIG. 3 is a perspective view of a preferred embodiment of a flexible duct used in the device according to the invention;

Figure 1:
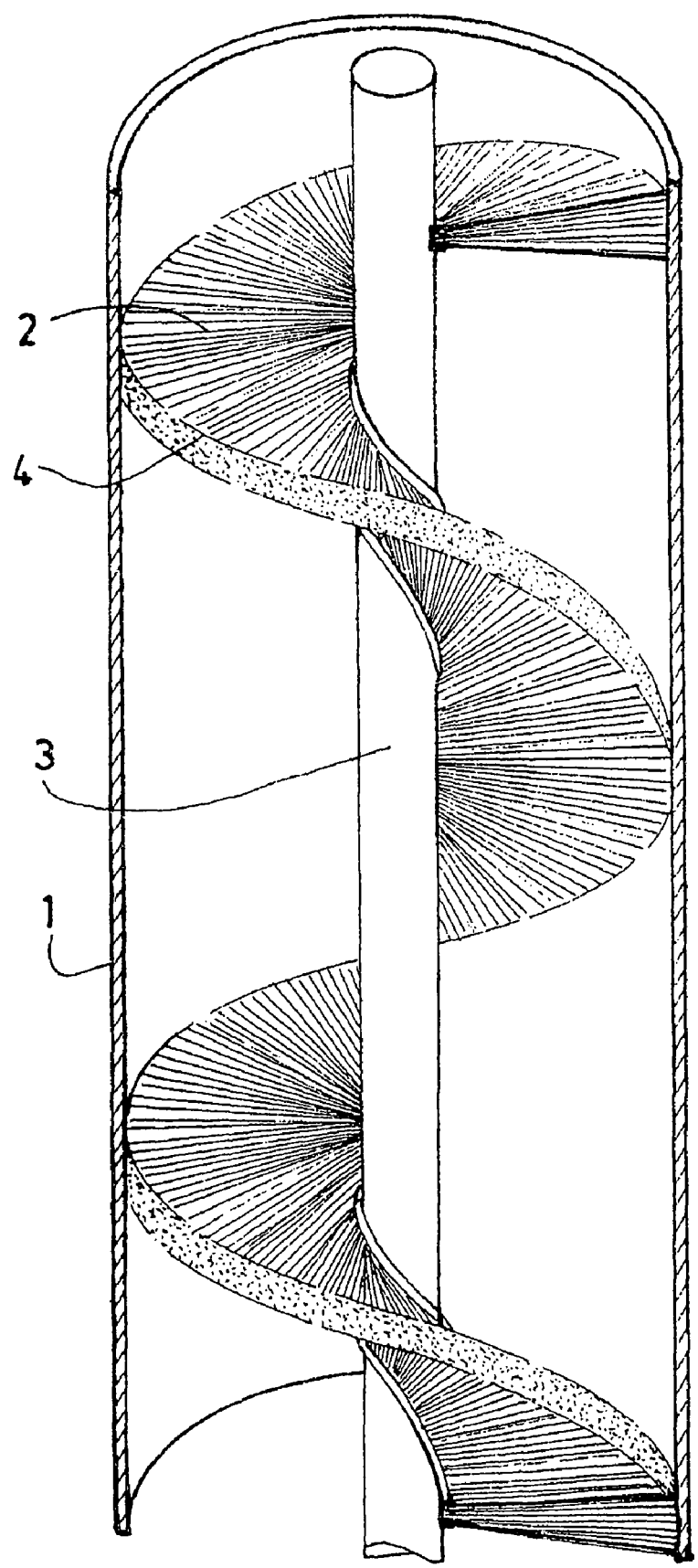
FIG. 1 is a perspective view of a portion of a helical ramp of a device according to the invention, surrounded by a flexible duct, seen in cross section.

FIG. 1 shows a portion of a device according to the present invention, with a helical wrap (2) fastened to and wound around a central shaft (3) which here is a solid rod. The helical ramp may be bonded or welded via its base to the central rod. This spiral structure is encased by a flexible duct (1). This duct has a diameter such that the distance between the outer edge (4) of the helical ramp and the duct is smaller than the size of the particles to be loaded. The outer edge (4) of the ramp (2) may be in rubbing contact with the internal surface of the flexible duct.

FIG. 2 illustrates schematically the concatenation of two shaft elements (6), each bearing a helical ramp (2) and separated by an intermediate element (5). The intermediate element (5) is connected to the shaft elements (6) by an articulation means (8), for example a ring/hook system, allowing the device to be easily and rapidly fitted and/or unfitted. In the zone with an intermediate element (5), between two helical ramps (2), the beads are in free fall. This allows the loading rate to be increased.

FIG. 3 shows a preferred embodiment of the flexible duct (1) used in the present invention. In this embodiment, the flexible duct includes two straight folds (7a, 7b), diametrically opposed to one another and closed at their base by one or more lines of stitches (8). Each fold defines a lateral band (9a, 9b) that extends toward the outside of the duct. One or more eyelets (10) may be provided in each lateral band. These eyelets are used for attaching the flexible duct in the upper part of the reactor (see FIG. 5) or to ensure secure fastening of the various modules of the device according to the invention (see FIG. 4). The width of the lateral bands is not a key factor, but it is generally between 3 and 10 cm. The lateral bands may be lined with a reinforcing strip (not shown), which is bonded or fastened by additional lines of stitches.

Figure 4:
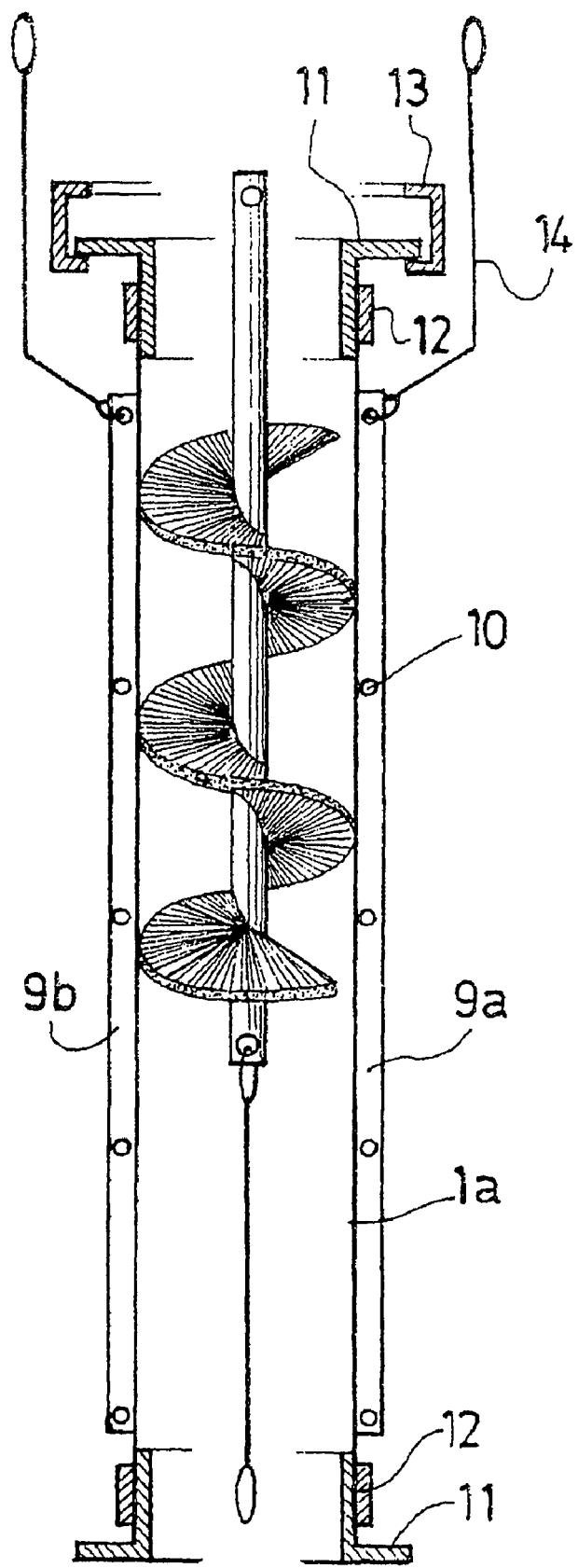
FIG. 4 is a sectional view of a module of a loading device according to the invention.

With FIG. 4, the flexible duct has not been manufactured as a single component, as in FIG. 2, but is made up of several flexible duct segments (1a), only one of which is shown here. This segment includes two lateral bands (9a, 9b) formed by straight folds, as explained in FIG. 3. A series of eyelets (10) is placed along each lateral band. The duct segment (1a) includes, at each of its ends, a flange (11) fastened to the duct segment (1a) by a clamping collar (12). The lower flange of a first duct segment may be fastened to the upper flange of the next flange segment by means of a quick-fit fastener (13). The first and last eyelets (10) of each lateral band (9a, 9b) are used for attaching a security cable (14) intended to prevent the lower module from becoming disconnected if the system for joining the duct segments together, formed by the flanges (11), the clamping collar (12) and the quick-fit fastener (13), were to fail.

Figure 5:
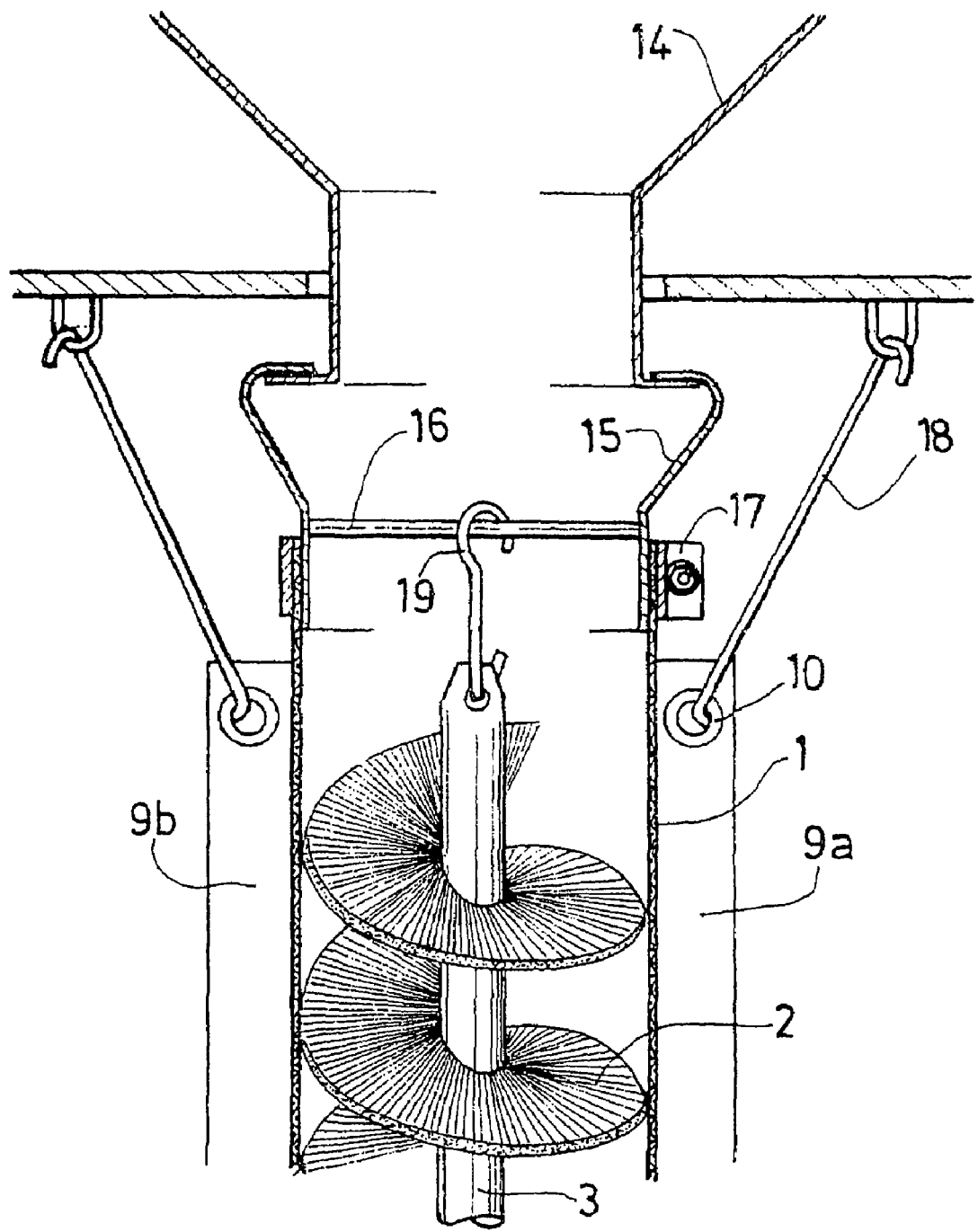
FIG. 5 is a sectional view showing the attachment of a device according to the invention in the upper part of the vessel.

Finally, FIG. 5 illustrates another possible way of attaching the device of the present invention in the upper part of the reactor. In this figure, a hopper (14) is installed in the manhole of a reactor and firmly fastened to the upper part of the latter. An adapter (15) is attached at the lower edge of the hopper (14). A transverse attachment bar (16) is provided in the adapter. The flexible duct (1) is fastened by a clamping collar (17) to the adapter (15) and also attached via a suspension system (18) to the upper part of the reactor. The central shaft (3) bearing the helical ramp (2) is attached via a hook (19) to the transverse bar (16) of the adapter (15).

EXAMPLE

Two loading trials were carried out in succession with two different ducts, the heights of which above the ground were the same, both being equal to 16 meters.

One of the ducts was in accordance with the present invention of the type described with reference to FIGS. 1 to 4. It consisted of a cylindrical sheath made of woven cotton with a thickness of 2 mm and an inside diameter of 140 mm. Said duct was formed from eight modules 2 m in length, each of these modules consisting of a flexible sheath and, inside the flexible sheath, two internal elements of equal length, that is to say a cable as intermediate element and a shaft element in the form of a hollow tube with a diameter of 35 mm, made of ordinary steel. The helical ramp supported by the hollow tube had a brush-like structure formed by crimping resin bristles into a U-shaped section welded to the central metal shaft. The intermediate elements and the shaft elements equipped with helical ramps were conventionally joined together via their ends using snap clasps.

The helix pitch of the helical ramp was 300 mm, corresponding to a slope of 45°, i.e. preferably between 10° and 80° and even more preferably between 20° and 60°.

The other duct was a flexible cylindrical sheath, of 125 mm inside diameter, suspended vertically, in which the beads were left to drop in free fall.

For these trials, inert beads made of alumina, manufactured by the German company Vereinigte Füllkörper Fabriken GmbH and sold in France under the name Duranit, were used. These beads had the following diameters:

6.35 mm (¼ inch): trials denoted below by A;

12.67 mm (½ inch): trials denoted below by B; and 19.05 mm (¾ inch): trials denoted below by C.

A metal plate simulating the bottom of the reactor was placed 1 m from the lower end of each duct.

In the impact trials, the mass of the beads used was the following:

trial A, 25 kg;

trial B, 25 kg; and trial C, 10 kg.

Results

TABLE 1

Number of beads broken or damaged with the two types of loading

| Trial | Number of beads broken or damaged | % broken or damaged beads |
|---|---|---|
| A | 0/66000 | 0.00 |
| B | 0/8000 | 0.00 |
| C | 5/2000 | 0.25 |

TABLE 2

Comparison of the results obtained with the duct according to the invention and the flexible duct known in the art

| | % broken or damaged beads | |
|---|---|---|
| Trial | Duct according to the invention | Flexible duct according to the prior art |
| A | 0.00 | 10.00 |
| B | 0.00 | 35.00 |
| C | 0.25 | 22.00 |

It may therefore be stated that, in all the trials, the percentage of intact beads is almost 100% with the duct according to the invention, while it varies between 65% and 90% with the flexible duct according to the prior art.

This is essentially explained by the difference between the speeds of discharge of the beads from the two ducts, this speed being only about 3.1 m/s with the straight duct according to the invention, for beads with a diameter of 19.05 mm (¾ inch), whereas it is 6.5 m/s with the flexible duct according to the prior art, placed vertically.

These results clearly illustrate the advantage offered by the device and the method according to the invention for loading the bottom part of a chemical reactor, or a bed support tray, with inert beads.

As indicated above, this device and this method are however not limited to this application, but may also be used for loading or unloading a vessel with solid particles, such as catalyst particles, the integrity and the physical qualities of which have to be preserved.

The invention claimed is:

1. A device for introducing solid particles into a chemical reactor vessel, comprising a flexible and cylindrical duct, the solid particles flowing through said duct from the top down, wherein inside the duct, at least one helical ramp is fastened to and wound around a central shaft, said helical ramp having a width such that the distance between the outer edge of the helical ramp and the duct is smaller than the size of the solid particles to be introduced, the helical ramp and the duct each comprise a suspension mechanism in the upper part of the vessel, wherein the suspension mechanism of the ramp is independent of the suspension mechanism of the duct.

2. The device as claimed in either of claim 1, wherein the central shaft is a flexible or rigid rod or tube.

3. The device as claimed in either of claim 1, wherein the central shaft is formed by a plurality of shaft elements, which are flexible or rigid and being articulated one with respect to another; wherein at least one of the articulated shaft elements comprises a helical ramp.

4. The device as claimed in claim 3, wherein the length of the shaft elements is between 0.05 and 5 meters.

5. The device as claimed in claim 3, wherein the shaft elements are articulated to one another by means of intermediate elements, which do not form an obstacle to the free fall of the solid particles, inside the duct, between two helical ramps.

6. The device as claimed in claim 5, wherein the intermediate elements are selected from the group consisting of slings, ropes, cables, chains and flexible tubes.

7. The device as claimed in claim 5, wherein the length of the intermediate elements is between 0.05 and 5 meters.

8. The device as claimed in claim 1, wherein the helical ramp has a brush-like structure, the number and the rigidity of the bristles that form the brush being sufficient to support the weight of the particles to be introduced when the loading rate is at maximum.

9. The device as claimed in claim 1, wherein a helix pitch of the helical ramp is between 5 and 100 cm.

10. The device as claimed in claim 1, wherein the flexible and cylindrical duct is made of a woven or knitted textile material, or made of a plastic optionally reinforced by fibers or by a textile material.

11. The device as claimed in claim 1, wherein the flexible and cylindrical duct includes, over part or all of its length, two straight folds which are diametrically opposed to one another and closed at their base by a line of stitches, each fold defining a band extending radially to the outside of the duct.

12. The device as claimed in claim 11, wherein the band carries or includes means for fastening the duct.

13. The device as claimed in claim 1, wherein the inside diameter of the duct is between 50 mm and 400 mm.

14. A method of loading a vessel, with solid particles, which comprises fastening a loading device as claimed in claim 1 via its upper end at an opening in the upper part of the vessel, and introducing the solid particles via the upper end of said device.

15. The method of loading a vessel as claimed in claim 14, wherein the helical ramp is fastened to the upper part of the vessel by a suspension mechanism independent of that of the duct.

16. The method of loading a vessel as claimed in either of claim 14 or 15, wherein said method further comprises distributing, by an operator, of the particles exiting via the lower end of said loading device over the entire surface of the bottom of the vessel or of the loading front.

17. The method of loading a vessel as claimed in either of claim 14 or 15, wherein the vessel to be filled is a multitube reactor comprising a plurality of vertical tubes, wherein said vessel comprises a flexible and cylindrical duct, the particles flowing through said duct from the top down, and inside the duct, at least one helical ramp fastened to and wound around a central shaft, said ramp having a width such that the distance between the outer edge of the ramp and the duct is smaller than the size of the solid particles to be introduced.

18. The device as claimed in claim 4, wherein the length of the shaft elements is between 0.5 and 2 meters.

19. The device as claimed in claim 5, wherein the shaft elements are articulated to one another by means of flexible intermediate elements, which do not form an obstacle to the free fall of the solid particles, inside the duct, between two helical ramps.

20. The device as claimed in claim 7, wherein the length of the intermediate elements is between 0.5 and 2 meters.

21. The device as claimed in claim 9, wherein the helix pitch of the helical ramp is between 15 and 80 cm.

22. The device as claimed in claim 13, wherein the inside diameter of the duct is between 100 mm and 200 mm.

* * * * *